E. BALOD.
BUTTER CUTTER.
APPLICATION FILED JAN. 8, 1913.
1,062,429.
Patented May 20, 1913.
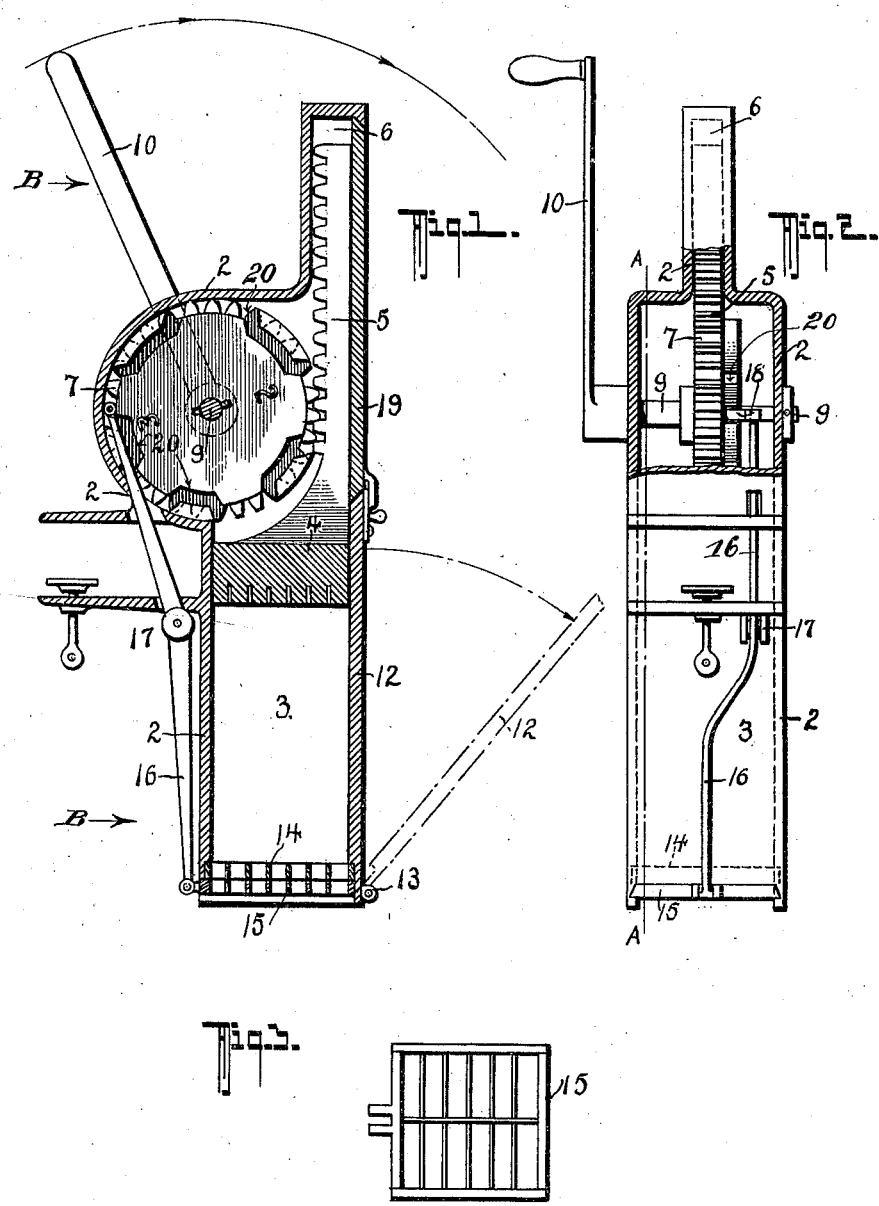

UNITED STATES PATENT OFFICE.

EDWARD BALOD, OF VANCOUVER, BRITISH COLUMBIA, CANADA.

BUTTER-CUTTER.

1,062,429.  Specification of Letters Patent.  Patented May 20, 1913.

Application filed January 8, 1913. Serial No. 740,816.

*To all whom it may concern:*

Be it known that I, EDWARD BALOD, subject of the Emperor of Russia, residing at Vancouver, in the Province of British Columbia, Canada, have invented a new and useful Butter-Cutter, of which the following is a specification.

This invention relates to a machine for cutting butter, the machine being specially designed for use in restaurants and the like where the butter is required in small blocks suitable for the table. It is for the cutting of these small blocks from the large pound or two pound blocks that the machine is intended.

The invention is particularly described in the following specification, reference being made to the drawings by which it is accompanied, in which:

Figure 1 is a section along the line A A of Fig. 2. Fig. 2 is an elevation and part section looking in the direction of the arrow B B, part of the casing being removed to show the combined spur and cam wheel and the coöperative roller of the latter. Fig. 3, a detail of the sliding grid to be described later.

The device consists of a casing 2 the lower end of which is rectangular in cross section forming a compression chamber 3 into which the large block of butter is inserted through the door 12. In this chamber 3 is caused to slide a closely fitting plunger 4, which is operated by the rack 5 either attached to or integral with it and the pinion 7, the pinion being keyed on to the shaft 9 which is carried in suitable bearings in the casing 2 and rotated by the handle 10.

In the lower end of the compression chamber 3 is a grid 14 which is removably attached to the casing 2 by sliding it into grooves therein. Below this grid 14 is a similar grid 15 in slidable contact with its lower face and movable in slideways provided for it in the casing 2. Suitably connected to this lower grid 15 is a lever 16 pivoted at 17 and projecting through the casing 2 into the chamber in which the pinion 7 works. The upper end of the lever thus projecting into the chamber is provided with a roller 18 which engages in a series of cam grooves 20 arranged in the side face of the pinion 7. As the pinion turns, these cam grooves cause the lever 16 to oscillate at predetermined intervals and the groove is so arranged to make the movement a clean sharp one with definite periods of rest between. The lever thus oscillated causes the grid 15 to slide under the lower face of the grid 14, the grids being so arranged that after each movement of the lower one, their blades or divisions again correspond. The sliding movement is so timed with respect to the downward movement of the rack and plunger as to give to the grid 15 a definite number of strokes during each stroke of the plunger.

In action the butter will be forced, under the pressure of the plunger, through the openings of the grid 14, being thus subdivided into bars of cross section corresponding to the openings in the grid. At definite intervals in the down stroke of the plunger the lower grid 15 slides across the lower face of the grid 14 cutting the bars of butter pressed through the upper grid into short blocks. The length of travel of the lower grid being equal to the width of one opening in the grids, the openings in the grids after each cut again correspond and the butter continues to be pressed through under the pressure of the plunger 7 to be cut by the return stroke of the grid 15 and the movement is repeated until the whole block is pressed out.

It will be noted that the lower face of the plunger is grooved to correspond with the grids so that the butter is pressed clear out of the grid 14 at the end of the plunger stroke.

The pinion 7 and rack are so arranged that only a fraction, in the drawing shown as half, of a revolution of the lever is sufficient to complete the stroke of the plunger. The cam grooves 20 are arranged in sections around the face of the pinion 7, each section corresponding with the fraction of a revolution through which it is necessary to turn the pinion in order to make one complete stroke of the plunger 4. Thus by changing the angular position of the pinion on the shaft 9, the roller 18 engages in a different section of the cam groove 20. These different sections of the cam groove are arranged to give a different number of oscillations to the lever 16, and therefore the grid 15, during a stroke of the plunger 4. By this means the number of strokes of the slide 15 during one stroke of the plunger 4 may be adjusted. The sections themselves will be numbered or otherwise clearly marked to distinguish them and each section will have a corresponding key-way to fit the key in the shaft 9.

Provision is made for easy accomplishment of the adjustment by providing a door 19 slidable in the front of the casing, supplementing the door 12, through which the rack and plunger may be removed. The pinion 7 may then be moved along the shaft 9 until clear of the key and rotated until the desired section is engaging the roller 18. The pinion is then replaced on its key and the rack and plunger put back in position.

Having now particularly described my invention, I hereby declare that what I claim as new and desire to be protected in by Letters Patent, is:

1. A device for subdividing butter, comprising the combination with a rectangular chamber having a grid across one end, of a plunger vertically movable within the chamber, a second grid corresponding with the fixed grid and slidable across its lower face, means for endwise moving the plunger, and means coöperative therewith for reciprocating the movable grip.

2. A device for subdividing butter, comprising the combination with a rectangular chamber having a grid across one end and one of its sides hinged to form a door, a second grid slidable across the under face of the aforesaid grid, a plunger vertically slidable in the chamber, means for operating said plunger, and means coöperative therewith for moving the movable grid at predetermined intervals across the fixed grid.

3. A device for subdividing butter, comprising the combination with a rectangular chamber having a grid removably secured in one end and one of its sides hinged to form a door, a second grid slidable across the under face of the aforesaid grid, a plunger having its under end grooved to correspond with the bars of the grid, means for operating said plunger and means coöperative therewith for moving at predetermined intervals the movable grid through a distance equivalent to the pitch of the bars of the grid.

4. A device for subdividing butter, comprising the combination with a rectangular chamber having one of its sides hinged to afford access to the interior, a plunger endwise movable within the chamber said plunger having a rack integral with or secured to it with the teeth of which rack mesh those of a pinion secured on a rotatable shaft, a fixed grid secured to the lower end of the chamber, a movable grid slidable across the under face of the fixed grid, said movable grid being operated by a pivotally mounted lever one end of which is connected to the grid and the other adapted to engage a circumferential groove in the face of the pinion.

5. A device for subdividing butter, comprising the combination with a chamber of rectangular cross section having one of its sides hinged to afford access, a plunger endwise movable within the chamber, said plunger having rack teeth which mesh with those of a gear wheel secured on a shaft rotatable in bearings in the frame of the machine, one face of said pinion having a circumferential cam groove, a grid subdividing the cross section area of the rectangular chamber, a corresponding grid movable across the under face of the fixed grid, a lever connected to the movable grid at one end and pivoted intermediate of its ends to the machine, the other end of the lever having a roller projecting into the cam groove of the toothed wheel and means for changing the angular position of the wheel on the shaft.

6. A device for subdividing butter, comprising the combination with a rectangular casing the lower part of which is rectangular in cross section and provided with a hinged door, the upper part of the casing being shaped to inclose the operative mechanism of the device, a plunger vertically slidable in the rectangular portion and having a rack extending upward from it, a gear wheel removably secured on a shaft rotatable in the casing of the machine by means of a handle lever on the outer end, the face of said pinion being provided with a circumferential groove which is at intervals concentric at different radii, a fixed grid in the lower end of the rectangular chamber, a second grid movable across the underside of the fixed grid, a lever pivotally mounted to the machine intermediate of its ends, one end of said lever being connected to the movable grid and the other end having a roller projecting from it into the circumferential groove of the wheel, provision for changing the angular position of the wheel on the shaft, and means for securing the device to a table or the like.

In testimony whereof I have signed my name to this specification in the presence of two subscribing witnesses.

EDWARD BALOD.

Witnesses:
 ROWLAND BRITTAIN,
 MAY WHYTE.